US008644044B2

(12) United States Patent
Gupta et al.

(10) Patent No.: US 8,644,044 B2
(45) Date of Patent: Feb. 4, 2014

(54) POWER ELECTRONICS AND INTEGRATION SYSTEM FOR PROVIDING A COMMON HIGH CURRENT INVERTER FOR USE WITH A TRACTION INVERTER AND AN AUXILIARY INVERTER

(75) Inventors: Sudhir Kumar Gupta, Erie, PA (US); Ajith Kuttannair Kumar, Erie, PA (US)

(73) Assignee: General Electric Company, Schenectady, NY (US)

(*) Notice: Subject to any disclaimer, the term of this patent is extended or adjusted under 35 U.S.C. 154(b) by 635 days.

(21) Appl. No.: 12/578,689

(22) Filed: Oct. 14, 2009

(65) Prior Publication Data

US 2011/0085363 A1 Apr. 14, 2011

(51) Int. Cl.
*H02M 7/537* (2006.01)
*H02M 5/45* (2006.01)

(52) U.S. Cl.
USPC ............................................ 363/131; 363/37

(58) Field of Classification Search
USPC .................................................. 363/37, 131
See application file for complete search history.

(56) References Cited

U.S. PATENT DOCUMENTS

| 6,021,052 | A * | 2/2000 | Unger et al. ..................... 363/26 |
| 6,160,696 | A | 12/2000 | Bailey et al. |
| 6,631,080 | B2 * | 10/2003 | Trimble et al. .................. 363/34 |
| 7,227,273 | B2 * | 6/2007 | Ahmad et al. ............... 290/40 C |
| 2006/0152085 | A1 * | 7/2006 | Flett et al. ........................ 307/75 |
| 2009/0174353 | A1 * | 7/2009 | Nakamura et al. ....... 318/400.27 |

FOREIGN PATENT DOCUMENTS

| EP | 0828341 A2 | 3/1998 |
| EP | 1445853 A2 | 8/2004 |

OTHER PUBLICATIONS

Search Report and Written Opinion from corresponding PCT Application No. PCT/US2010/052491 dated Jul. 22, 2011.
Lixin Tang et al., "Experimental High-Performance Control of Two Permanent Magnet Synchronous Machines in an Integrated Drive for Automotive Applications", IEEE Transactions on Power Electronics, IEEE Service Center, Piscataway, NJ, US, vol. 23, No. 2, Mar. 1, 2008, pp. 977-984, XP011203509, ISSN: 0885-8993 figures 5, 15 Section III.
Heinz Ruedi et al., "Intelligent Paralleling",, Mar. 2009, pp. 20-22, XP002648419, Retrieved from the Internet: URL:http://www.igbt-driver.com/fileadmin/Public/PDF/Papers/bp__2009__Intelligent__Parallelling. pdf [retrieved on Jul. 7, 2011] p. 20, left-hand column figures 2, 3.

(Continued)

*Primary Examiner* — Adolf Berhane
*Assistant Examiner* — Emily P Pham
(74) *Attorney, Agent, or Firm* — GE Global Patent Operation; John A. Kramer

(57) ABSTRACT

A system for using an IGBT module, electrically rated for use in a traction inverter used with a powered system, in an auxiliary inverter used with the powered system which requires a different electrically rated IGBT module than the traction inverter, the system including an IGBT module, including plurality of IGBTs as part of the IGBT module, electrically rated for use with a traction inverter, and a plurality of gate drives each configured to singularly connect to a respective one of the plurality of IGBTs within the IGBT module. All three phases of three-phase electrical power of the auxiliary inverter are associated with the IGBT module.

18 Claims, 3 Drawing Sheets

(56) References Cited

OTHER PUBLICATIONS

Xianjin Huang et al., "Power electronics used in Chinese electric locomotives", Power Electronics and Motion Control Conference, 2009. IPEMC '09. IEEE 6th International, IEEE, Piscataway, NJ, USA, May 17, 2009, pp. 1196-1200, XP031484819, ISBN: 978-1-4244-3556-2.

* cited by examiner

POWER ELECTRONICS AND INTEGRATION SYSTEM FOR PROVIDING A COMMON HIGH CURRENT INVERTER FOR USE WITH A TRACTION INVERTER AND AN AUXILIARY INVERTER

BACKGROUND OF THE INVENTION

Embodiments of the invention relate to a powered system, such as a locomotive and/or an off-highway vehicle. Other embodiments relate to inverters and other power electronics in a powered system.

High current inverters employ high power gate turn-off devices (GTOs) when used with a traction motor, which switch in and out of conduction in response to gating signals from a system controller to invert a DC voltage to frequency-controlled AC voltage. One type of GTO that may be used is an insulated gate bipolar transistor (IGBT).

An IGBT combines the simple gate drive characteristics of MOSFETs with the high current and low saturation voltage capability of bipolar transistors. Plural IGBTs are usually used in combination. Hence, IGBTs have a lower on-state voltage drop with high blocking voltage capabilities in addition to fast switching speeds.

FIG. 1 depicts internal insulated gate bipolar transistors (IGBT) 12 that may be provided in an IGBT module 5. ("Module" refers to a discrete package having one or more solid-state devices, a housing or body covering the devices for protection and insulation purposes, and one or more leads that are electrically connected to the devices for accessing the devices external to the housing.) As illustrated, three IGBTs 12 are provided. Each IGBT 12 has a gate lead (G), a collector lead (C), and an emitter lead (E). Each gate lead (G), collector lead (C), and emitter lead (E) is available external the module 5 to be individually connected, as required for an intended function or operation. The IGBT module 5 depicted in FIG. 1 is used in a traction inverter. In the traction inverter, the gate leads (G) are connected in parallel. Though illustrated as being connected internally, the gate leads may also be connected externally.

A gate drive 22 also provided. The gate drive 22 is a switching element that is used to switch on and switch off the IGBT module. A primary function of the gate drive 22 is to convert logic level control signals into an appropriate voltage and current for efficient, reliable switching of the IGBT module 5. The gate drive 22 provides current and voltage of relatively precise values to assure that the IGBT module 5 is switched on and off, or gated into and out of conduction, at precise times. The gate drive 22 also provides for isolation of logic level control and fault feedback signals by having an isolated power supply associated with each gate drive. Gate drives are typically controlled by a processor. For illustration purposes only, the gate drive 22 shown schematically in the drawings is considered to include the processor and power supply. Operating conditions of the gate drive 22 and IGBT module 5 are monitored, specifically, parameters associated with the gate, emitter, and collector, to ensure an appropriate switching scheme for the IGBT module 5.

IGBT modules are currently used in traction inverters and auxiliary inverters associated with such powered systems as locomotives and off-highway vehicles. However, with respect to such powered systems, the same electrically rated IGBT module cannot be used economically in both traction inverters and auxiliary inverters. This is because auxiliary inverters require much less amperage than traction auxiliary inverters. Typically, traction IGBT modules have a current capability higher than double or triple that which is needed for an auxiliary inverter. Owners and operators of such powered systems would benefit from a system where a common IGBT module may be used in both traction inverters and auxiliary inverters.

BRIEF DESCRIPTION OF THE INVENTION

Embodiments of the present invention relate to a power electronics system for a powered system, for using an insulated gate bipolar transistor (IGBT) module, electrically rated for use in a traction inverter used within the powered system, in an auxiliary inverter used within the powered system which requires a different electrically rated IGBT module than the traction inverter. The system comprises an IGBT module, including at least three IGBTs as part of the IGBT module, electrically rated for use with a traction inverter, and at least three gate drives each configured to singularly connect to a respective one of the at least three IGBTs within the IGBT module. All three phases of three-phase electrical power of the auxiliary inverter are associated with the IGBT module, meaning that the IGBT module is used for controlling and/or generating all three phases of the three-phase electrical power either alone or in conjunction with other electrical components.

In another embodiment, an integration system is disclosed for providing a same rated IGBT module, having a plurality of individual IGBTs within the IGBT module, as part of a first inverter of a powered system and a second inverter of the powered system where each inverter requires a different rated IGBT module. The integration system comprises a first inverter connection subsystem configured to connect the IGBT module in the first inverter to operate the IGBT module so that the electrical rating of the IGBT module is acceptable for the first inverter, and a second inverter connection subsystem configured to connect the IGBT module in the second inverter so that the electrical rating of the IGBT module is acceptable for the second inverter. ("Acceptable" means that the electrical rating of the IGBT module is compatible with normal operation of the indicated inverter.)

Another embodiment relates to a power electronics system for a powered system. The power electronics system comprises an IGBT module that includes at least three IGBTs as part of the IGBT module. The IGBT module is electrically rated for use with a traction inverter in the powered system. The IGBT module is electrically connected to an auxiliary inverter within the powered system that requires a different electrically rated IGBT module than the traction inverter. The system further comprises at least three gate drives each singularly connected to a respective one of the at least three IGBTs within the IGBT module. All three phases of three-phase electrical power of the auxiliary inverter are associated with the IGBT module.

Another embodiment relates to a power electronics system for a powered system. The power electronics system comprises a first IGBT module and a second IGBT module. The first IGBT module includes a plurality of first IGBTs as part of the first IGBT module, which are electrically connected to a traction inverter in the powered system. The first IGBT module is electrically rated for use with the traction inverter. The second IGBT module includes at least three second IGBTs as part of the second IGBT module, which are electrically connected to an auxiliary inverter in the powered system. The auxiliary inverter requires a different electrically rated IGBT module than the traction inverter. Nevertheless, the second IGBT module is electrically rated the same as the first IGBT module. To accommodate using same-rated IGBT modules in both the traction inverter and the auxiliary inverter, the system further comprises at least three first gate drives each singularly connected to a respective one of the at least three second IGBTs within the second IGBT module. In one embodiment, all three phases of three-phase electrical power of the auxiliary inverter are associated with the second IGBT module, and all the first IGBTs in the first IGBT module are associated with only one phase of three-phase electrical power of the traction inverter. In another embodiment, at least some of the at least three second IGBTs within the second IGBT module are associated with different phases of the three-phase electrical power of the auxiliary inverter, and all the first IGBTs in the first IGBT module are associated with only one phase of three-phase electrical power of the traction inverter.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, exemplary embodiments of the invention will be described and explained with additional specificity and detail through the use of the accompanying drawings in which.

DETAILED DESCRIPTION OF THE INVENTION

Figure 1:
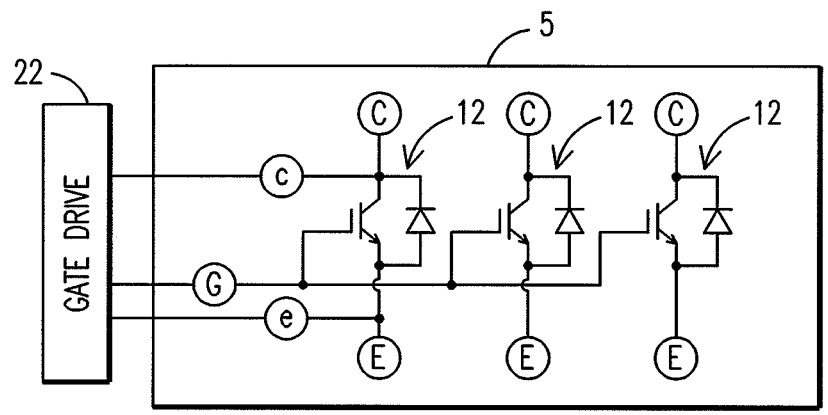
FIG. 1 depicts an illustration of prior art internal insulated gate bipolar transistors (IGBTs) as may be provided in an IGBT module.

Reference will be made below in detail to exemplary embodiments of the invention, examples of which are illustrated in the accompanying drawings. Wherever possible, the same reference numerals used throughout the drawings refer to the same or like parts.

Though exemplary embodiments of the present invention are described with respect to rail vehicles, or railway transportation systems, specifically locomotives, exemplary embodiments of the invention are also applicable for use with other powered systems, such as but not limited to off-highway vehicles, agricultural vehicles, and/or transportation vehicles, each which may use at least one engine and has traction motors.

Referring now to the drawings, embodiments of the present invention will be described. Exemplary embodiments of the invention can be implemented in numerous ways, including as a system and an apparatus. Several embodiments of the invention are discussed below.

Figure 2:
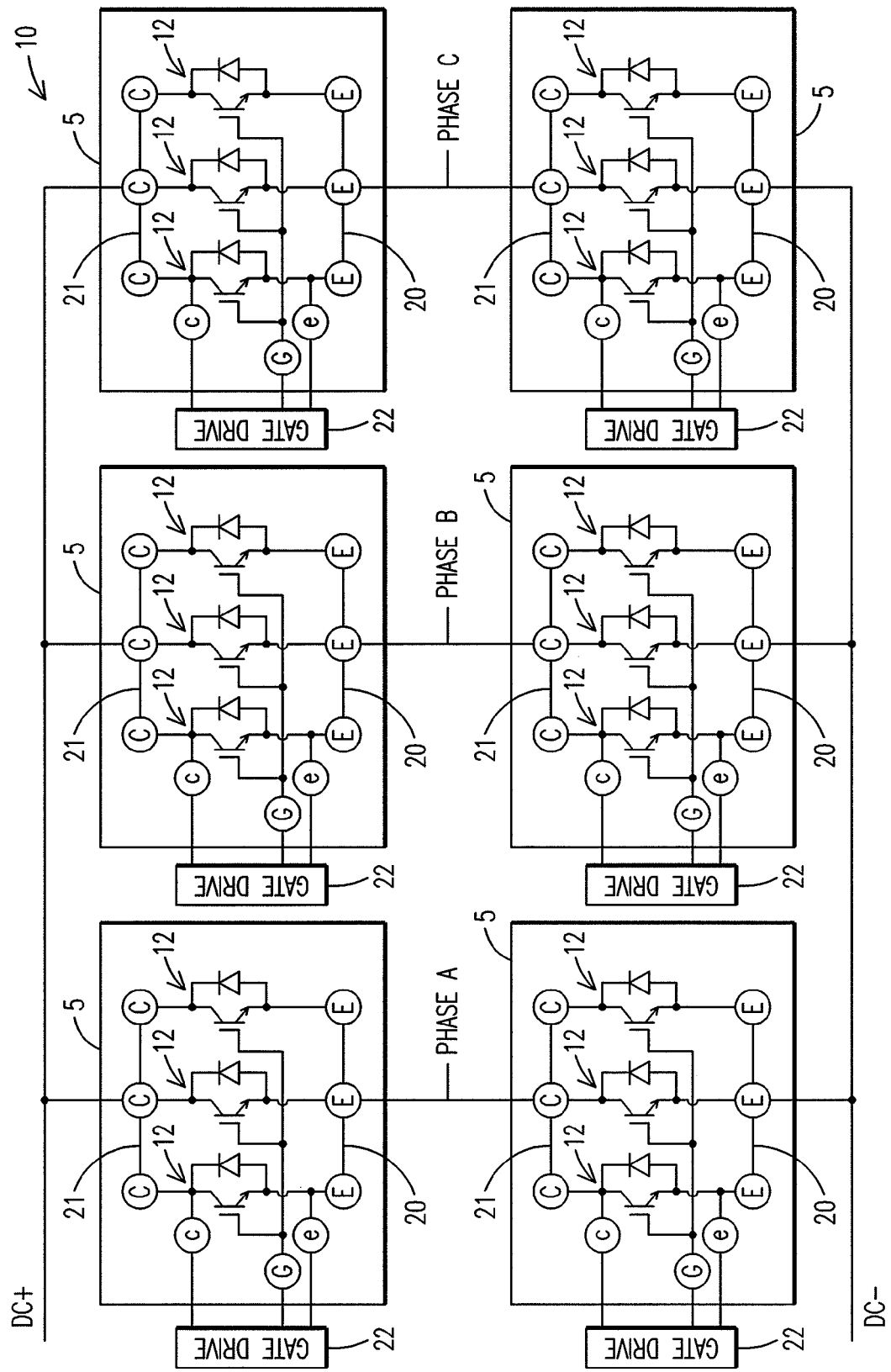
FIG. 2 depicts a plurality of IGBT modules as may be used in a traction inverter, according to an embodiment of the present invention.

FIG. 2 depicts a plurality of IGBT modules 5 as may be used in a traction inverter 10, as part of a power electronics and integration system of an embodiment of the present invention. (A traction inverter is a power electronics system/device that is used to provide an electrical power signal, such as a three-phase AC signal, to a traction motor.) Each module 5 has three IGBTs 12 within it. In this exemplary embodiment, the gate leads (G) are connected in parallel inside of the IGBT module 5. A first bus bar 20 is provided for connecting the emitter leads (E), externally, together in parallel. A second bus bar 21 is provided for connecting the collector leads (C), externally, in parallel. As discussed previously, a gate drive 22 is provided. The gate drive is connected to the emitter leads (E), which are connected in parallel by the bus bar 20, the collector leads (C), which are connected in parallel by the bus bar 21, and the gate leads (G), which are internally connected in parallel. Though three IGBTs 12 are illustrated as being within the IGBT module 5, any number of IGBTs 12 may be within the IGBT module 5.

As further illustrated in FIG. 2, the plurality of IGBT modules 5 operate together. The modules 5 are first configured in pairs. Positive DC power is delivered through the collector leads (C) on one module 5 of the pair. Negative DC is delivered through the emitter leads (E) on the second module of the pair. A phase of three-phase electrical power is associated with each pair of modules. Thus, in this embodiment, three pairs of modules are required. It is evident that each gate drive 22 is associated with a phase of three-phase electrical power.

Figure 3:
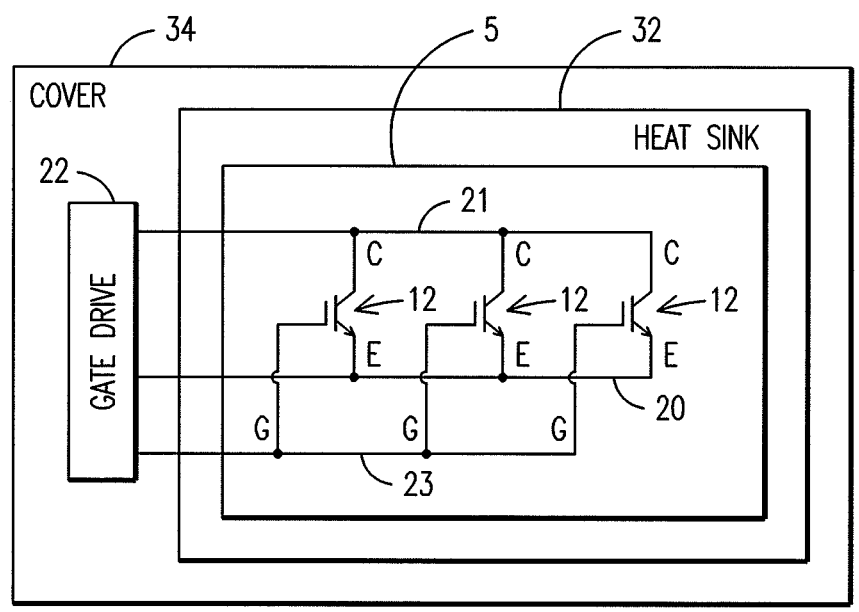
FIG. 3 depicts another IGBT module as may be used in a traction inverter, according to an embodiment of the present invention.

FIG. 3 depicts another exemplary embodiment of an IGBT module used in conjunction with a traction inverter. As illustrated, the gate leads (G) are not connected in parallel inside of the IGBT module. A third bus bar 23 (which may include optional resistors) is provided for connecting the gate leads (G) in parallel external the module.

Figure 4:
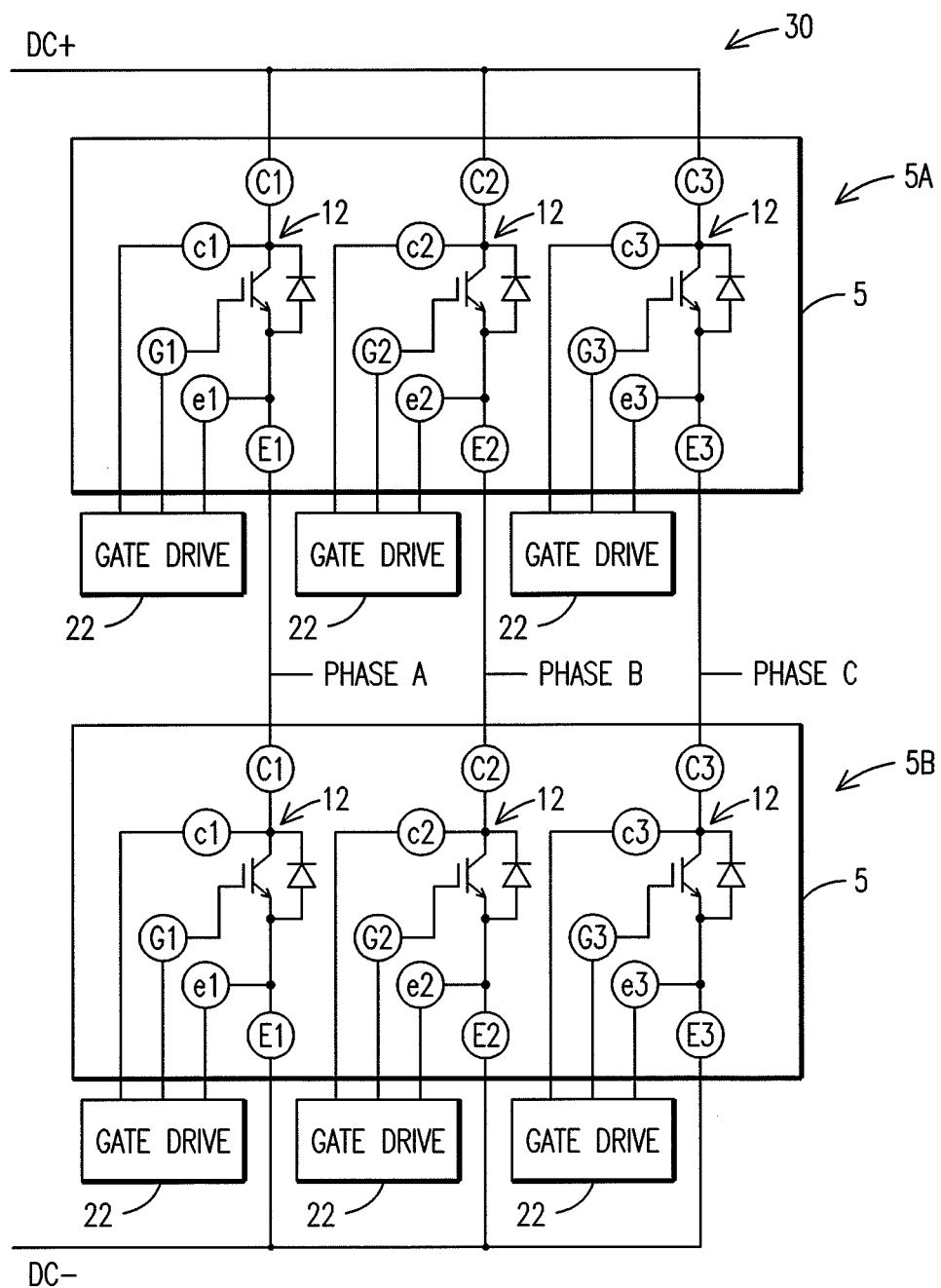
FIG. 4 depicts traction inverter IGBT modules used in an auxiliary inverter, according to an embodiment of the present invention.

FIG. 4 depicts traction inverter IGBT modules used in an auxiliary inverter 30. An auxiliary inverter is an inverter used for providing electrical power signals to non-traction auxiliary loads, which requires a different electrically rated IGBT module than the traction inverter. Typically, in a particular powered system a traction inverter will have a first power rating, and an auxiliary inverter will have a second power rating that is lower than the first power rating. As illustrated, the modules 5 work in pairs in the auxiliary inverter 30. The modules illustrated in FIG. 4 are the same electrically rated modules as disclosed in FIG. 2 and FIG. 3. None of the leads, the collector leads (C), emitter leads (E), and gate leads (G), are connected in parallel. A gate drive 22 is connected to each IGBT 12. More specifically, for each IGBT 12, a respective gate drive 22 is connected to the emitter lead (E), the collector lead (C), and the gate lead (G). Three gate drives 22 are provided for each module 5. Each gate drive 22 is associated with one phase of three-phase electrical power. Therefore, when the module 5 has more than three IGBTs 12, more than one IGBT 12 may be connected, in parallel, to a respective gate drive 22. As further illustrated in FIG. 4, IGBTs 12 may be used in pairs in the auxiliary inverter 30, i.e., one pair for each phase. Thus, depending on the number of IGBTs per module, the auxiliary inverter 30 may be made from 3, 2, or one traction IGBT modules 5, where gate drives 22 are provided for each phase of three-phase electrical power.

Because the same IGBT module 5 is being used in both the traction inverter 10 and the auxiliary inverter 30, a same heat sink 32 may be used for each IGBT module, as illustrated in FIG. 3. The heat sink 32 is compatible with the IGBT module when it is used with a traction inverter and/or an auxiliary inverter, meaning that the heat sink has sufficient heat dissipation capacity in either context. Also, the same cover 34, and/or housing, may also be used, as also illustrated in FIG. 3. The housing for the IGBT module is compatible with the IGBT module when it is used with a traction inverter and/or an auxiliary inverter. Thus, instead of stocking different IGBT modules and/or module parts for both traction inverters 10 and auxiliary inverters 30, one type of modules and parts are required where the modules may be interchangeable between the traction inverter and the auxiliary inverter. Though the cover 34 is illustrated as surrounding the heat sink, this is not necessarily the case. Those skilled in the art will recognize that this is simply a block representation, not to illustrate placement of the cover 34 and heat sink 32 with respect to each other. Therefore, it is possible that the heat sink 32 is attached to the cover 34, where the heat sink 32 is larger than the cover 34.

Another embodiment relates to a power electronics system for a powered system. With reference again to FIG. 4, the power electronics system comprises an IGBT module 5 that includes at least three IGBTs 12 as part of the IGBT module 5. The IGBT module 5 is electrically rated for use with a traction inverter 10 in the powered system. The IGBT module is electrically connected to an auxiliary inverter 30 within the powered system that requires a different electrically rated IGBT module than the traction inverter. The system further comprises at least three gate drives 22 each singularly connected to a respective one of the at least three IGBTs 12 within the IGBT module. All three phases (Phase A, Phase B, Phase C) of three-phase electrical power of the auxiliary inverter are associated with the IGBT module 5.

Another embodiment relates to a power electronics system for a powered system. The power electronics system comprises a first IGBT module 5 (FIG. 2 or FIG. 3) and a second IGBT module 5A (FIG. 4). The first IGBT module 5 includes a plurality of "first" IGBTs 12 as part of the first IGBT module 5, which are electrically connected to a traction inverter 10 in the powered system. The first IGBT module is electrically rated for use with the traction inverter. (The traction inverter may include additional IGBT modules.) The second IGBT module 5A includes at least three "second" IGBTs 12 as part of the second IGBT module, which are electrically connected to an auxiliary inverter 30 in the powered system. The auxiliary inverter requires a different electrically rated IGBT module than the traction inverter. Nevertheless, the second IGBT module is electrically rated the same as the first IGBT module. To accommodate using same-rated IGBT modules in both the traction inverter and the auxiliary inverter, the system further comprises at least three first gate drives 22 (FIG. 4) each singularly connected to a respective one of the at least three second IGBTs within the second IGBT module 5A. In one embodiment, all three phases (Phase A, Phase B, Phase C) of three-phase electrical power of the auxiliary inverter 30 are associated with the second IGBT module 5A, and all the first IGBTs in the first IGBT module 5 (FIG. 2 or FIG. 3) are associated with only one phase of three-phase electrical power of the traction inverter. In another embodiment, all the first IGBTs in the first IGBT module are associated with only one phase of three-phase electrical power of the traction inverter, and at least some of the at least three second IGBTs within the second IGBT module 5A are associated with different phases of the three-phase electrical power of the auxiliary inverter. For example, in the case where the second IGBT module includes three IGBTs, each IGBT may be associated with a different phase of three-phase electrical power, or two of the IGBTs may be associated with a first of the three phases and the third IGBT associated with a second of the three phases.

The auxiliary inverter 30 may include additional IGBT modules. For example, in another embodiment, the power electronics system further comprises a third IGBT module 5B (see FIG. 4) that includes at least three "third" IGBTs 12 as part of the third IGBT module. The third IGBT module is electrically connected to the auxiliary inverter 30 in the powered system, and is electrically rated the same as the first IGBT module. The system further comprises at least three "second" gate drives 22 each singularly connected to a respective one of the at least three third IGBTs within the third IGBT module 5B. In one embodiment, a first one of the second IGBTs and a first one of the third IGBTs are associated with a first phase (Phase A) of the three-phase electrical power, a second one of the second IGBTs and a second one of the third IGBTs are associated with a second phase (Phase B) of the three-phase electrical power, and a third one of the second IGBTs and a third one of the third IGBTs are associated with a third phase (Phase C) of the three-phase electrical power.

Another embodiment relates to an integration system for providing a same rated IGBT module, having a plurality of individual IGBTs within the IGBT module, as part of a first inverter of a powered system and a second inverter of the powered system where each inverter requires a different rated IGBT module. A first inverter connection subsystem is configured to connect the IGBT module in the first inverter to operate the IGBT module so that the electrical rating of the IGBT module is acceptable for the first inverter. As illustrated in FIG. 4, the first inverter connection subsystem comprises at least three gate drives 22, where each gate drive 22 is individually connected to a respective one of the at least three individual IGBTs 12 within the IGBT module 5. The first subsystem may also include the connectors (not numbered) for connecting the gate drives 22 to their respective IGBTs 12. All three phases of three-phase electrical power in the powered system are associated with the IGBT module.

A second inverter connection subsystem configured to connect the IGBT module in the second inverter so that the electrical rating of the IGBT module is acceptable for the second inverter. As is illustrated in FIG. 2, the second inverter connection system comprises a first bus bar 21 configured to connect each collector lead of each IGBT 12 within the IGBT module 5 in parallel, a second bus bar 20 configured to connect each emitter lead of each IGBT 12 within the IGBT module 5 in parallel, and a single gate drive 22 to control the IGBT module 5. The second subsystem may also include the connectors (not numbered) for connecting the gate drive 22 to the IGBT 12. A single phase of three-phase electrical power in the powered system is associated with the IGBT module.

Though the exemplary embodiments provided above disclose three IGBTs 12 within each IGBT module 5, 5A, 5B, a plurality of IGBTs 12 may be utilized. For example, the IGBT module 5, 5A, 5B may have as few as two IGBTs 12 or any number in excess of three IGBTs 12.

While the invention has been described with reference to various exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc., do not denote any order or importance, but rather the terms first, second, etc. are used to distinguish one element from another.

What is claimed is:

1. A power electronics system for a powered system, the power electronics system comprising:
a first IGBT module, including a plurality of first IGBTs as part of the first IGBT module, electrically connected to and configured to provide an electrical power signal to a traction inverter in the powered system, the first IGBT module having an electrical rating configured for use with the traction inverter;

a second IGBT module, including a plurality of second IGBTs as part of the second IGBT module, electrically connected to and configured to provide an electrical power signal to an auxiliary inverter having a different electrical rating than the traction inverter in the powered system, the second IGBT module having an electrical rating configured for use with the traction inverter, wherein the second IGBT module is connected to the auxiliary inverter such that the electrical rating of the second IGBT module is acceptable for the auxiliary inverter; and a plurality of first gate drives each singularly connected to a respective one of the plurality of second IGBTs within the second IGBT module.

2. The system of claim 1, further comprising:

a third IGBT module, including a plurality of third IGBTs as part of the third IGBT module, electrically connected to the auxiliary inverter in the powered system, wherein the third IGBT module is electrically rated the same as the first IGBT module; and a plurality of second gate drives each singularly connected to a respective one of the plurality of third IGBTs within the third IGBT module.

3. The system of claim 2, wherein a first one of the plurality of second IGBTs and first one of the plurality of third IGBTs are associated with a first phase of a three-phase electrical power, a second one of the plurality of second IGBTs and second one of the plurality of third IGBTs are associated with a second phase of the three-phase electrical power, and a third one of the plurality of second IGBTs and third one of the plurality of third IGBTs are associated with a third phase of the three-phase electrical power.

4. A power electronics system for a powered system the power electronics system comprising:

an IGBT module, including plural IGBTs as part of the IGBT module, the IGBT module electrically rated for use with a traction inverter in the powered system, wherein the IGBT module is electrically connected to and configured to provide an electrical power signal to an auxiliary inverter within the powered system which requires a different electrically rated IGBT module than the traction inverter; and plural gate drives each singularly connected to a respective one of the IGBTs within the IGBT module, each of the IGBTs having a gate, collector, and emitter terminal that is singularly connected to a corresponding one of the gate drives wherein the gate, collector, and emitter terminals of each of the plurality of IGBTs are not connected in parallel to corresponding gate, collector, and emitter terminals of others of the IGBTs;

wherein all three phases of three-phase electrical power of the auxiliary inverter are associated with the IGBT module.

5. A power electronics system for using an IGBT module, electrically rated for use with a traction inverter used within a powered system, with an auxiliary inverter used within the powered system which requires a different electrically rated IGBT module than the traction inverter, the power electronics system comprising:

an IGBT module, including plural IGBTs as part of the IGBT module, the IGBT module electrically rated for use with the traction inverter;

plural gate drives each configured to singularly connect to a respective one of the IGBTs within the IGBT module, each of the IGBTs having a gate, collector, and emitter terminal singularly connected to a corresponding one of the gate drives, wherein the gate, collector, and emitter terminals of each of the IGBTs are not connected in parallel to corresponding gate, collector, and emitter terminals of others of the IGBTs; and wherein the IGBT module which is electrically rated for use with the traction inverter is electrically connected to and configured to provide an electrical power signal to the auxiliary inverter which requires the differently electrically rated IGBT module than the traction inverter, and wherein all three phases of three-phase electrical power of the auxiliary inverter are associated with the IGBT module.

6. The system according to claim 5, further comprising a heat sink for the IGBT module that is compatible with the IGBT module when it is used with a traction inverter and/or an auxiliary inverter.

7. The system according to claim 5, further comprising a housing for the IGBT module that is compatible with the IGBT module when it is used with a traction inverter and/or or an auxiliary inverter.

8. The system according to claim 5, wherein each gate drive is individually associated with one of the three phases of the three-phase electrical power.

9. The system according to claim 5, wherein the gate drives are each configured to singularly connect to an emitter lead, collector lead, and gate lead of a respective one of the IGBTs within the IGBT module.

10. The system according to claim 5, wherein the powered system comprises at least one of a rail vehicle or another off-highway vehicle.

11. An integration system for providing an IGBT module that has an electrical rating configured for normal operation with a first inverter of a powered system but not for a second inverter of the powered system, the IGBT module having plural individual IGBTs within the IGBT module, the integration system comprising:

a first inverter connection subsystem configured to connect the IGBT module to the first inverter to provide a first electrical power signal to the first inverter wherein the electrical rating of the IGBT module is acceptable for the first inverter; and a second inverter connection subsystem configured to connect the IGBT module to the second inverter to provide a second electrical power signal to the second inverter wherein the electrical rating of the IGBT module is acceptable for the second inverter.

12. The integration system according to claim 11, wherein the second inverter connection subsystem comprises plural gate drives each individually connected to a respective one of the individual IGBTs within the IGBT module, wherein all three phases of three-phase electrical power in the powered system are associated with the IGBT module.

13. The integration system according to claim 11, wherein the first inverter connection subsystem comprises a first bus bar configured to connect each collector lead of each IGBT within the IGBT module in parallel, a second bus bar configured to connect each emitter lead of each IGBT within the IGBT module in parallel, and single gate drive to control the IGBT module, wherein a single phase of three-phase electrical power in the powered system is associated with the IGBT module.

14. The integration system according to claim 11, further comprising a heat sink usable with the IGBT module when it is provided in at least one of the first inverter or the second inverter.

15. The integration system according to claim 11, further comprising a housing for the IGBT module usable with the IGBT module when it is used in at least one of the first inverter or the second inverter.

16. The integration system according to claim 11, wherein the first inverter is a traction inverter, and the second inverter is an auxiliary inverter.

17. The integration system according to claim 11, wherein the powered system comprises at least one of a rail vehicle or an off-highway vehicle.

18. An electronics system comprising:
- a traction inverter having a first electrical rating corresponding to a first amperage compatible with normal operation of the traction inverter;
- an auxiliary inverter having a second electrical rating corresponding to a second amperage compatible with normal operation of the auxiliary inverter, the second electrical rating of the auxiliary inverter being substantially lower than the first electrical rating corresponding to the traction inverter;
- a first IGBT module including a first set of IGBTs as part of the first IGBT module, each of the IGBTs in the first set having gate, collector, and emitter terminals electrically connected in parallel to gate, collector, and emitter terminals, respectively, of other IGBTs in the first set, the first IGBT module configured for normal operation at the first electrical rating, the first IGBT module electrically connected to and configured to provide an electrical power signal to the traction inverter; and
- a second IGBT module including a second set of IGBTs as part of the second IGBT module, the second IGBT module configured for normal operation at the first electrical rating, each of the IGBTs in the second set having a gate, collector, and emitter terminal singularly connected to one of plural gate drives wherein the gate, collector, and emitter terminals of each of the IGBTs in the second set are not connected in parallel to corresponding gate, collector, and emitter terminals of others of the IGBTs in the second set, wherein the second IGBT module that is configured for normal operation at the first electrical rating is electrically connected to and configured to provide an electrical power signal to the auxiliary inverter having the second electrical rating which is substantially lower than the first electrical rating.

* * * * *